United States Patent
Soyuzov (10) Patent No.: US 11,559,042 B2
(45) Date of Patent: Jan. 24, 2023

(54) RETRACTABLE LEASH

(71) Applicant: Artem Anatolievich Soyuzov, Moscow (RU)

(72) Inventor: Artem Anatolievich Soyuzov, Moscow (RU)

( * ) Notice: Subject to any disclaimer, the term of this patent is extended or adjusted under 35 U.S.C. 154(b) by 377 days.

(21) Appl. No.: 16/612,425

(22) PCT Filed: May 15, 2017

(86) PCT No.: PCT/RU2017/000310
§ 371 (c)(1),
(2) Date: Nov. 11, 2019

(87) PCT Pub. No.: WO2018/212672
PCT Pub. Date: Nov. 22, 2018

(65) Prior Publication Data
US 2020/0060238 A1    Feb. 27, 2020

(51) Int. Cl.
*A01K 27/00* (2006.01)
*B65H 75/40* (2006.01)
*B65H 75/48* (2006.01)

(52) U.S. Cl.
CPC ......... *A01K 27/004* (2013.01); *B65H 75/406* (2013.01); *B65H 75/486* (2013.01)

(58) Field of Classification Search
CPC .............................. A01K 27/004; A01K 27/00
See application file for complete search history.

(56) References Cited

U.S. PATENT DOCUMENTS

| | | | |
|---|---|---|---|
| 6,904,872 B2 | 6/2005 | Müller | |
| 6,925,967 B1 | 8/2005 | Woodruff | |
| 2009/0183691 A1 | 7/2009 | Hassan | |
| 2011/0120389 A1* | 5/2011 | Yackley | A01K 27/004 119/796 |
| 2013/0125832 A1* | 5/2013 | Tang | A01K 27/004 119/794 |
| 2016/0157466 A1* | 6/2016 | Gunn | A01K 27/004 119/797 |
| 2019/0350172 A1* | 11/2019 | Liu | A01K 27/004 |

FOREIGN PATENT DOCUMENTS

JP      2012120500 A      6/2012

* cited by examiner

*Primary Examiner* — Kristen C Hayes (57) ABSTRACT

Retractable relates to retractable leashes for walking and training dogs or other animals and comprises a housing containing a spring-loaded spool having a leash wound on it and a device for controlling the length of the leash, comprising at least one means for locking the movement of the spool, wherein the device for controlling the length of the leash comprises a device for determining the movement of the spool, an electronic device linked thereto for controlling the means for locking the movement of the spool, a device for activating and deactivating the electronic device for controlling the means for locking the movement of the spool, at least one actuator of the means for locking the movement of the spool comprising a fixing device, the actuator being connected to the device for controlling the means for locking the movement of the spool, and at least one power supply.

17 Claims, 5 Drawing Sheets

ID TABLE# RETRACTABLE LEASH

TECHNICAL FIELD

The invention relates to a device for self-retracting leashes having adjustable leash length and intended for walking and/or training of dogs and other animals.

Nowadays retractable leashes are widespread throughout the world. A conventional retractable leash consists of a spring-loaded spool having a leash wound thereon, a device for limiting the length of the leash and a means for controlling most often in the form of button, which are disposed in the housing. The advantage of these devices over a conventional leash is that during movement of the animal the leash does not slacken, but retracts and extends from the housing. As a result, the leash does not get tangled in the limbs of the animal and the legs of its owner, does not clutch at obstructions on the ground and does not become dirty. Also an option for mechanical locking of the leash for a length required for a user is provided in the up-to-date retractable leashes. When this function is activated usually the leash does not extend and retract into the reel. It is exactly this feature that constitutes a shortcoming in currently known devices of such a type: in the event of locking of the leash the reel loses all its advantages—actually the leash in the hands of the owner comes out to be just a piece of rope of a fixed length. Apart from that, besides the potential issues listed above, there is one more negative aspect of this shortcoming—the lack of a possibility of prompt restriction of the movement of the animal at the stage of the leash slackening, whereas eliminating such a stage from the device operation may in some situations prevent the animal itself from getting injured and/or the people around from getting harm. Therefore, there continues to be relevant a problem consisting in developing a retractable leash the structure of which is devoid of the above-listed shortcomings and will allow for ensuring a permanent control over the movements of the pet without performing unnecessary actions.

BACKGROUND OF THE INVENTION

The closest prior art solution of the claimed invention is a mechanical device of an extendible leash for domestic animals described in the U.S. Pat. No. 6,904,872 (published on 14 Jun. 2005) and comprising a housing, a spring-loaded spool having a leash wound thereon, a device for controlling the length of the leash and a means for controlling (a button).

The shortcoming of said device is a complexity of the structure due to the presence of a great number of elements mechanically interacting under the conditions of high loads, which increases the number of the probable wear spots of the elements of the device. Apart from that, a great number of mechanical couplings in the structure make it vulnerable in the event of ingress of dirt into the housing, since this may lead to a blocking of the mechanism for reeling the leash off and reeling the leash in. Also the structure of the device and a certain order of interaction between the elements exclude a possibility of prompt change of maximum allowed length of the leash for reeling off.

Technical Problem

The problem underlying the invention is to develop a retractable leash the structural design of which will allow for achievement of a technical effect consisting in a simplification of the structure, reducing the number of mechanically interacting elements subject to high loads, increasing the comfort of using and ensuring a possibility of a permanent operative control over the movements of the pet.

The Solution of the Problem

The problem set is solved by the fact that a retractable leash has been developed which comprises a housing containing a spring-loaded spool having a leash wound thereon and a device for controlling the length of the leash, comprising at least one means for locking the movement of the spool, wherein the device for controlling the length of the leash comprises a device for determining the movement of the spool, an electronic device linked thereto for controlling said means for locking the movement of the spool, a device for activating and deactivating the electronic device for controlling the means for locking the movement of the spool, at least one actuator of the means for locking the movement of the spool, said actuator being connected to the electronic device for controlling, and at least one power supply. Apart from that, the movement of the spool means a rotational movement performed by the spool around its axis.

Preferably a leash wound around a spool is, for example, a rope or a strap, or a cord, or other windable material.

First of all, the claimed technical effect can be achieved thanks to the retractable leash comprising an electronic device for controlling a means for locking the movement of the spool, a device for determining the movement of the spool, a device for activating and deactivating the electronic device for controlling the means for locking the movement of the spool, these devices being connected thereto, as has been mentioned above, at least one the actuator of the means for locking the movement of the spool, and their presence enables to exclude from the structure of the retractable leash most of the mechanical elements responsible for switching modes of reeling the leash off and reeling the leash in, which are subject to an increased wear under the conditions of continuous loads, as well as to perform a permanent operative control over the movements of the pet without a need for a great number of actions.

An implementation of the claimed retractable leash is preferred, in which the device for determining the movement of the spool is configured to determine the fact of movement made by the spool, to generate signals about the fact of movement made by the spool and to transfer them to the electronic device for controlling, and the electronic device for controlling is configured to record based on the received signals the fact of movement made by the spool and to determine based on the sequence of these signals the direction of this movement of the spool, in this case the sequence of these signals is an input of at least two different signals provided in a certain order. Also it is preferable that the device for activating and deactivating the electronic device for controlling is configured to set a reference point ($P_0$) in the electronic device for controlling, for a number of recorded movements of the spool, wherein the value of the remaining number of recorded movements of the spool in the direction ($d_{rem}$) of reeling the leash off equals 0, the electronic device for controlling being configured to compute $d_{rem}$ based on the signals received from the device for determining the movement of the spool and to generate a signal of locking the movement of the spool in the direction of reeling off, when $d_{rem}=0$.

Advisable is an embodiment, in which the electronic device for controlling is configured to generate a signal of locking the movement of the spool in the direction of reeling the leash off, when $d_{rem}=0$, and a signal of unlocking the movement of the spool in the direction of reeling the leash off and reeling the leash in, under subsequent occurrence of the event, when $d_{rem}>0$.

An implementation of the claimed retractable leash is preferred in which the actuator of the means for locking the movement of the spool comprises a spring-loaded fixing device of the means for locking the movement of the spool, configured to exert a locking impact on the means for locking the movement of the spool, and the means for locking the movement of the spool is spring-loaded. Apart from that, the possibility to exert a locking impact on the means for locking the movement of the spool means at least one surface of the fixing device contacting at least one surface of the means for locking the movement of the spool.

An embodiment of the retractable leash is preferred, in which the spool has been designed to have at least one protrusion configured to contact the means for locking the movement of the spool and to lock the movement of the spool in the direction of reeling the leash off and to unlock the movement of the spool, the surface of the means for locking the movement of the spool contacting in operation the surface of the protrusion of the spool, oriented in the direction of reeling in, is generally whole. Also the surface of the means for locking the movement of the spool, contacting in operation the surface of the protrusion of the spool, oriented in the direction of reeling off, is configured to lock the movement of the spool in the direction of reeling the leash off.

An embodiment of the retractable leash is preferred, in which the device for controlling the length of the leash comprises a spring-loaded mechanical device for controlling the means for locking the movement of the spool. Most preferred is an embodiment, in which the device for controlling the length of the leash comprises at least one additional means for locking the movement of the spool, which is spring-loaded and is configured to lock the movement of the spool in the direction of reeling the leash off or in the direction of reeling the leash off and reeling the leash in, the mechanical device for controlling is configured to control the additional means for locking the movement of the spool, the protrusion of the spool being configured to contact the additional means for locking the movement of the spool.

In one of the preferred embodiments of the retractable leash, a possibility of locking the movement of the spool not only in the direction of reeling off, but also in the direction of reeling the leash in, is realized through an arrangement where, for example, the surface of the additional means for locking the movement of the spool and the surface of the protrusion of the spool contacting each other during movement of the spool in the direction of reeling in are designed in the form of hooks, the additional means for locking the movement of the spool being spring-loaded toward the spool. In another preferred embodiment such a possibility is achieved through an arrangement where the additional means for locking the movement of the spool is spring-loaded in the direction away from the spool, and it moves from a resting position to a position exerting an impact under the action of the mechanical device for controlling.

Advisable is an implementation of the retractable leash, in which the mechanical device for controlling the means for locking the movement of the spool comprises at least one transferring means, connected to the fixing device of the means for locking the movement of the spool. Apart from that, the mechanical device for controlling is able to directly control a fixing device of the means for locking the movement of the spool.

In the most preferred embodiment of the retractable leash, the mechanical device for controlling comprises at least one transferring means, connected to the additional means for locking the movement of the spool.

Advisable is an embodiment of the retractable leash, in which the mechanical device for controlling is, for example, a spring-loaded button directly connected to the transferring means, the spring-loaded button being partially located outside the housing of the retractable leash and configured to receive the force applied by the user. Apart from that, the mechanical device for controlling may be configured both to lock in an activated state and without such a feature.

An embodiment of the retractable leash is preferred, in which the device for activating and deactivating the electronic device for controlling is chosen from a group, including a button, a toggle switch, a slider, a touching sensor or a combination thereof. Apart from that the device for activating and deactivating the electronic device for controlling may be configured both to fix in an activated state and without such a feature.

An embodiment of the retractable leash is preferred in which the electronic device for controlling is at least one controller and/or a processor, the actuator of the means for locking the movement of the spool is chosen from a group, including an electric, a hydraulic, a pneumatic actuator or a combination thereof, the device for determining the movement of the spool is chosen from a group, including an optical, a capacitive, a magnetoelectric, a contact, an inductive, a resistive, a mechanical, an infrared sensor, a rotation angle sensor (encoder) or a combination thereof.

The most preferred is an implementation of retractable leash, in which the device for determining the movement of the spool is an optical sensor, which comprises at least one optical pair—a transmitter and a receiver, the operation principle of the optical sensor consisting in transforming an electrical signal into light, transferring it via an optical channel and subsequently transforming it back into electrical signal. In the most preferred embodiment of the retractable leash the device for determining the movement of the spool represents at least two optical sensors, each comprising a transmitter and a receiver. Apart from that, it is advisable to make at least one through-hole on the periphery of the spool, which will allow for the passing of the ray from the transmitter located on one side of the spool to the receiver located on the same axis as the transmitter, on the other side of the spool.

An embodiment of the retractable leash is preferred in which the power supply is at least one accumulator or galvanic cell, and the housing comprises at least one charge indicator of the power supply, being, for example, a diode. Apart from that, in one embodiment of the retractable leash it is advisable that the housing of the retractable leash should contain an electric charge generator being, for example, a dynamo that makes up for the electric charge of the accumulator by converting the energy of spool rotation.

However, it is obvious to those skilled in the art that the listed embodiments of the main features characterizing the claimed retractable leash are given as an example only and are not limiting and/or exclusive. The dimensions, proportions, shapes and outlines of the elements in the drawings provided herein are represented schematically and may differ in the embodiments of the device, depending on the calculations and the required set of functions.

BRIEF DESCRIPTION OF THE DRAWINGS

The invention as claimed is explained using the following drawings:

DESCRIPTION OF THE EMBODIMENTS

Figure 1:
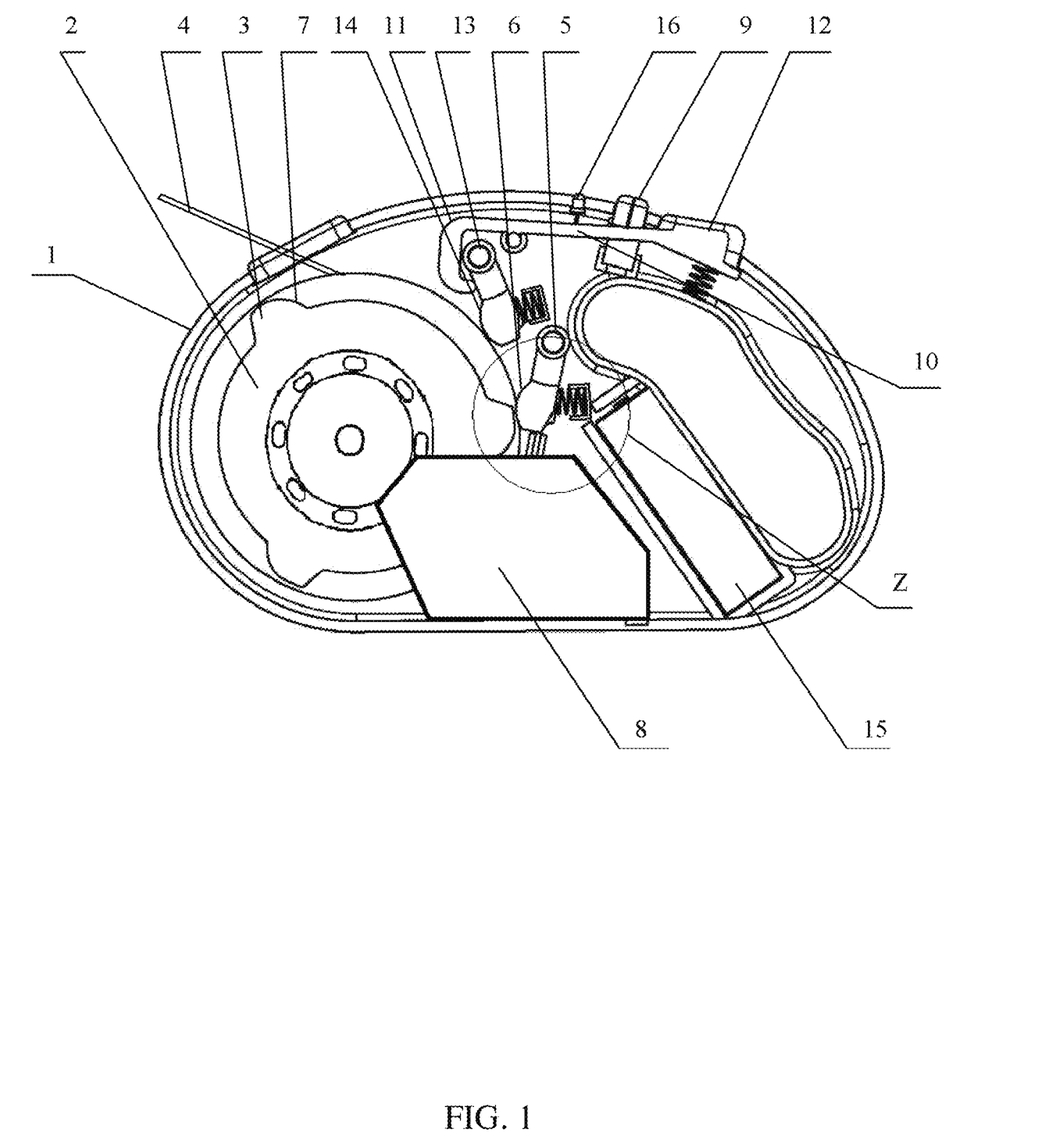
FIG. 1 is a longitudinal section view of the retractable leash.

FIG. 1 is a longitudinal section view of a retractable leash which comprises a housing (1) containing a spring-loaded spool (2) having protrusions (3) and a leash (4) wound thereon, a device for controlling the length of the leash, comprising a spring-loaded means (5) for locking the movement of the spool, the surface (6) of which contacts the surfaces (7) of the protrusions (3), a device for determining the movement of the spool (not shown on the figure), an electronic device (8) linked thereto for controlling the means (5) for locking the movement of the spool (2), a device (9) for activating and deactivating the electronic device (8) for controlling, a mechanical device (10) for controlling, comprising a transferring means (11) and a spring-loaded button (12) connected directly thereto, a spring-loaded additional means (13) for locking the movement of the spool, the surface (14) of which contacts the surfaces (7) of the protrusions (3), and a power supply (15), the housing (1) further comprising a charge indicator (16) of the power supply (15).

Figure 2:
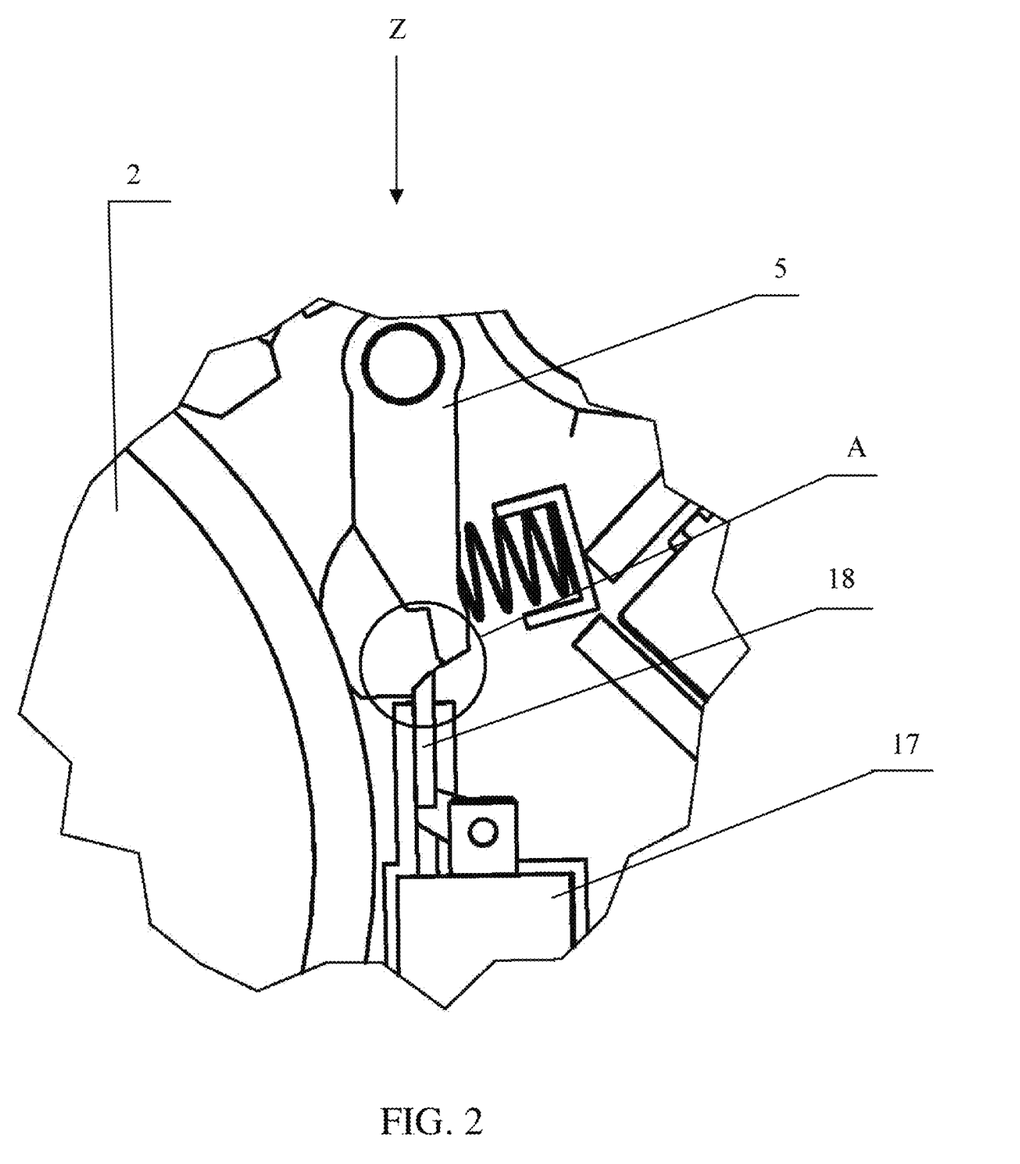
FIG. 2 is a blown up view of Z unit of FIG. 1.

FIG. 2 is a blown up view of Z unit of FIG. 1 having an actuator (17) of the means (5) for locking the movement of the spool, which is connected to the electronic device for controlling (not shown in FIG.) and comprises a spring-loaded fixing device (18) of the means for locking the movement of the spool (2).

Figure 3:
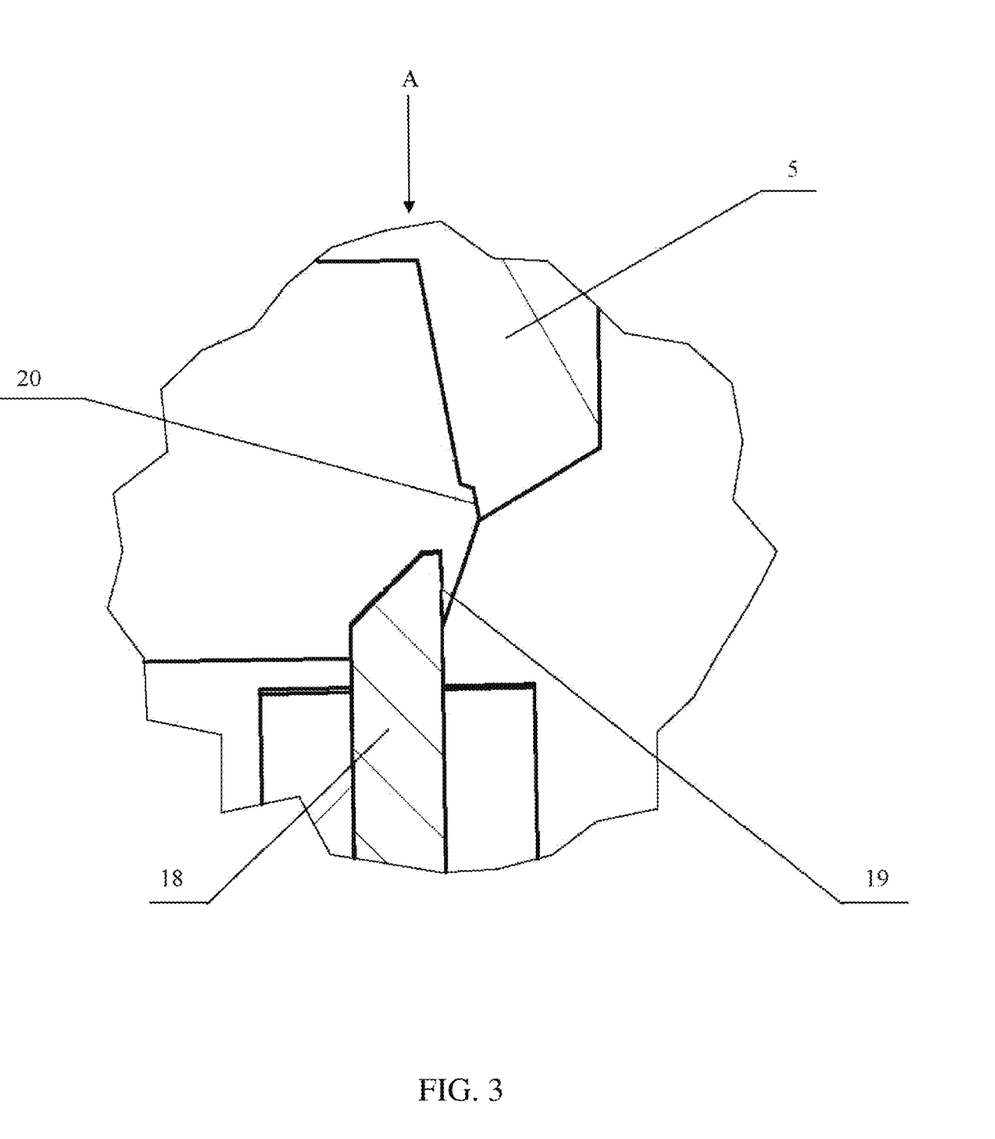
FIG. 3 is a blown up view of A unit of FIG. 2.

FIG. 3 is a blown up view of A unit of FIG. 2 having a fixing device (18), the surface (19) of which when contacting the surface (20) of the means (5) for locking the movement of the spool exerts a locking impact on the latter.

Figure 4:
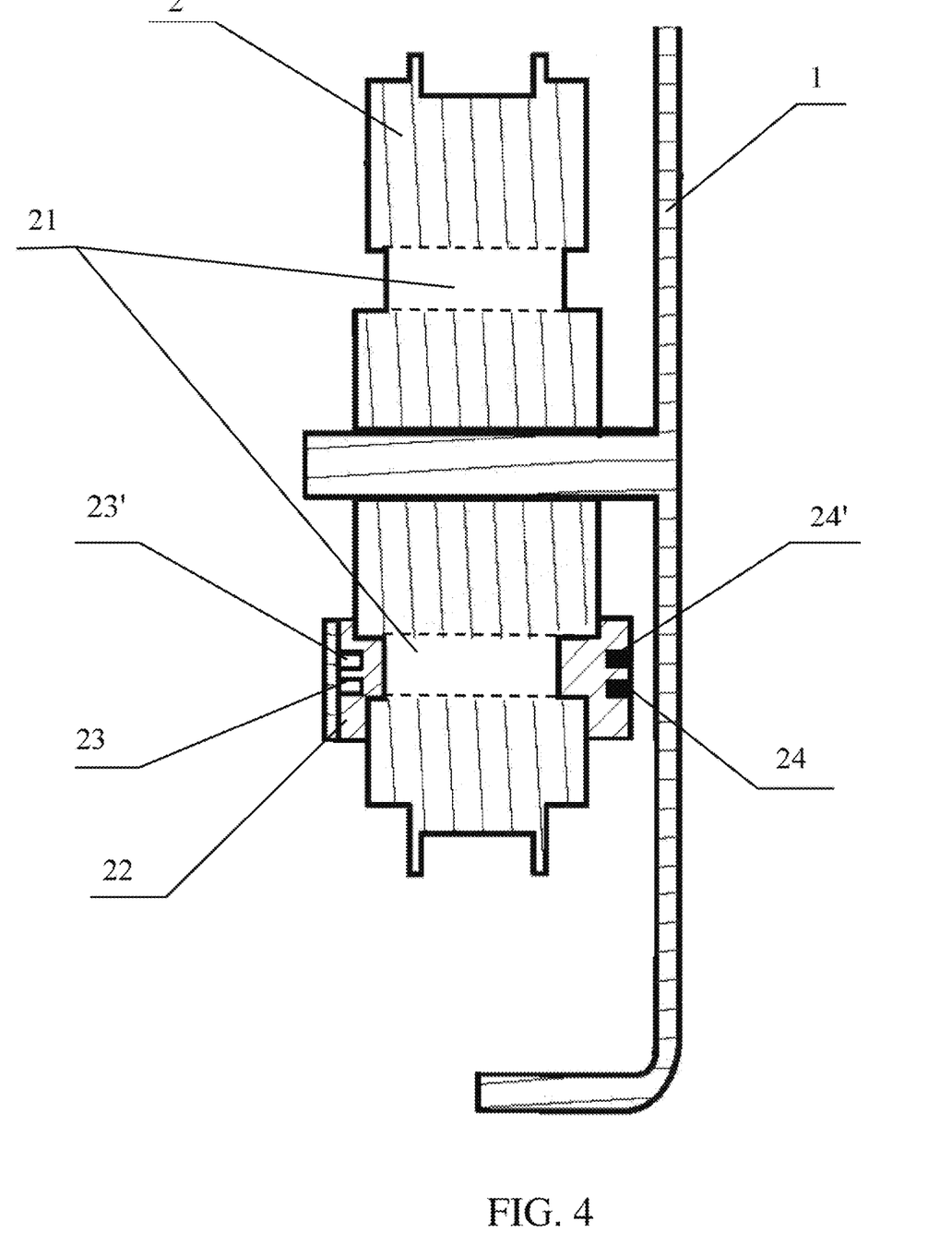
FIG. 4 is a cross section top view of the retractable leash.

FIG. 4 is a cross section top view of the retractable leash, comprising the housing (1) having a spring-loaded spool (2) with holes (21) that are through-holes and a device (22) for determining the movement of the spool, comprising the first optical sensor with a transmitter (23) and a receiver (24), and the second optical sensor with a transmitter (23') and a receiver (24').

Figure 5A:
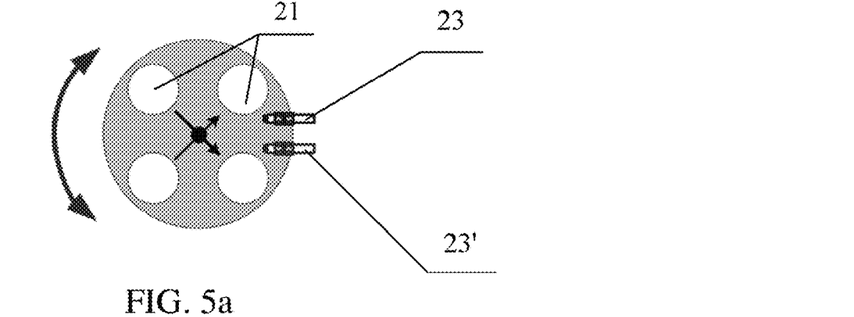
FIGS. 5a, 5b, 5c, 5d are a schematic representation of the options for the position of the spool relative to the transmitting elements of the device for determining the movement of the spool when making a turn.

FIG. 5a is a schematic representation of an embodiment of the position of the spool (2) relative to transmitters (23) and (23'), in which the rays do not pass through the holes (21).

Figure 5B:
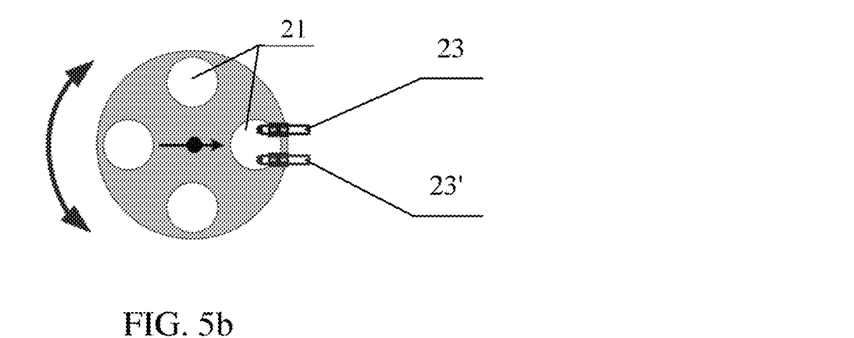

FIG. 5b is a schematic representation of an embodiment of the position of the spool (2), in which the rays of both transmitters (23) and (23') pass through the hole (21).

Figure 5C:
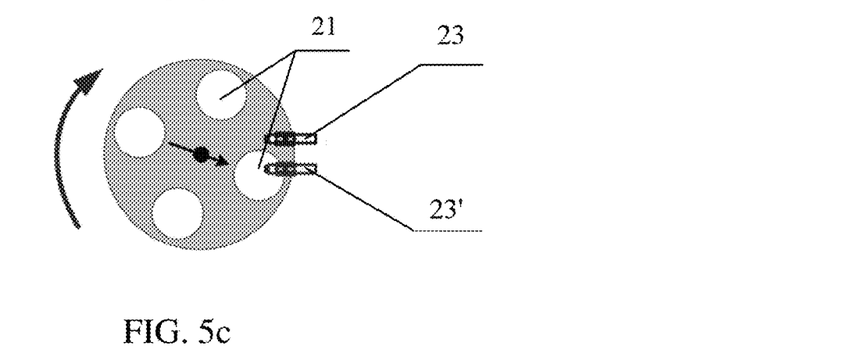

FIG. 5c is a schematic representation of an embodiment of the position of the spool (2) during its movement in the direction of reeling the leash in, in which the ray from the transmitter (23) does not pass through the hole (21) anymore, but the ray from the transmitter (23') still passes through through-hole (21).

Figure 5D:
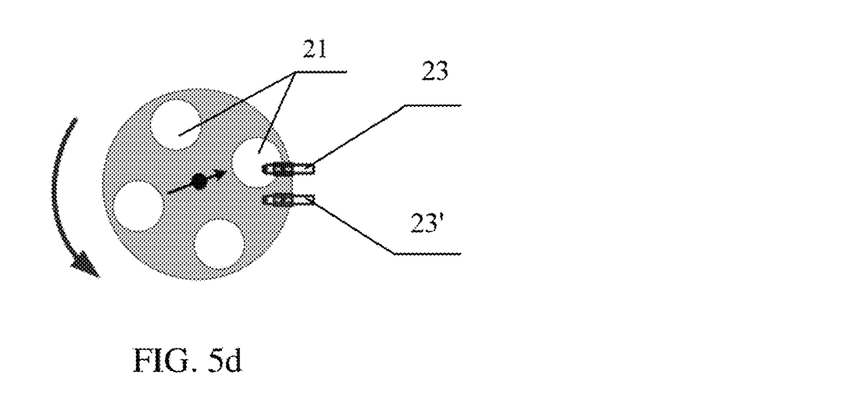

FIG. 5d is a schematic representation of an embodiment of the position of the spool (2) during its movement in the direction of reeling the leash off, in which the ray from the transmitter (23) still passes through the through-hole (21), but the ray from the transmitter (23') does not pass through the hole (21) anymore.

Operation of the retractable leash is described through the example of the most preferred embodiment provided in FIGS. 1-5d, which is realized in the following way:

When the retractable leash is in operation, the pet fastened to the leash (4) is able to move freely with the only limits caused by a maximum possible length of the leash. Apart from that, the fixing device (18) of the means (5) for locking the movement of the spool (2), in a position exerting a locking impact, contacts with its surface (19) the surface (20) of the means for locking the movement of the spool.

Where it is necessary to limit the radius of movement of the pet at a distance different from the maximum length of the leash (4), the device (9) for activating and deactivating the electronic device for controlling is exerted an impact for one time, thus activating the electronic device (8) for controlling. Activating the electronic device (8) for controlling causes the locking of the movement of the spool (2) in the direction of reeling the leash off and setting in the electronic device for controlling $P_0$, where $d_{rem}=0$ and from which $d_{rem}$ is subsequently computed based on the signals received from the device (22) for determining the movement of the spool. Apart from that, the movement of the spool (2) in the direction of reeling off is locked thanks to the fact that the electronic device (8) for controlling sends a controlling signal to the actuator (17), which moves the fixing device (18) in a direction away from the means (5) for locking the movement of the spool, thereby ceasing to exert a locking impact on the means (5) for locking the movement of the spool. As a result, the latter is pressed against the spool (2) under the action of the spring, the fixing device (18) returns to its initial position in the actuator (17) under the action of the spring. Apart from that, the spool (2) rotates in the direction of reeling off until the means (5) for locking the movement of the spool contacts the surface of the closest protrusion (3), oriented in the direction of reeling off, as a result of which the spool (2) loses a possibility to continue the movement in the direction of reeling the leash off.

The movement of the spool (2) is unlocked during a subsequent movement of the spool in the direction of reeling the leash in, wherein the protrusion (3) of the spool exerting an impact by its surface (7) on the surface (6) of the means (5) for locking the movement of the spool, as a result of which the latter, overcoming the resistance of the spring, moves in the direction away from the spool. Apart from that, the means (5) for locking the movement of the spool, overcoming the small resistance of the fixing device (18), pushes it away in the direction of the actuator (17). As a result of a further impact of the surface (7) of the protrusion (3) of the spool, the means (5) for locking the movement of the spool moves beyond the area of interaction with the fixing device (18) in a direction away from the spool (2), and the fixing device (18) under an impact of the spring returns to the position exerting a locking impact on the means (5) for locking the movement of the spool.

Also activating the electronic device (8) for controlling causes the device (22) for determining the movement of the spool connected thereto to be activated. In the activated state of the device (22) the transmitters (23) and (23') generate light rays, which passing through the through-holes (21), are received by the receivers (24) and (24') located opposite on the other side of the spool (2), and an alternation of the phases of passing and interruption of the rays determines the fact of the movement made by the spool. The direction of the movement of the spool (2) is determined by the electronic device (8) for controlling based on what sequence the signals come from the optical sensors and/or are interrupted. For example, if during receipt of the ray by a receiver of the first sensor (R) signal comes and during receipt of the ray by a receiver of the second sensor (Q) signal comes to the device (8) for controlling, and if apart from that a simultaneous receipt of both signals is determined by the device (8) for controlling as (RQ) event and the absence of both signals is determined as (00) event, then the full cycle of signal sequence in one direction is a sequence 00-R-RQ-Q (or the reverse one). The electronic device (8) for controlling records the current sequence of incoming signals, and a reverse sequence of their incoming, for instance, 00-R-RQ-R, is determined by the device (8) for controlling as a change in the direction of rotation of the spool to the opposite. Depending on the direction of the movement of the spool (2), the electronic device (8) for controlling sequentially performs addition/subtraction of the recorded movements of the spool and calculates $d_{rem}$ in this case. The result of calculations, wherein the value $d_{rem}$ becomes equal 0, automatically causes a generation by the electronic device (8) for controlling of a signal of locking the movement of the spool (2) in the direction of reeling off, in this case the process of locking and subsequent unlocking being performed according to the algorithm described above.

The operation of the electronic device (8) for controlling is deactivated by exerting an additional single impact on the device (9), the previously set value $P_0$ being reset in this case and the leash (4) ceasing to be limited in movement in both directions throughout its whole length.

Also at any given time under the conditions of the previously set point $P_0$ a user can promptly limit the movements of the pet for a length of the leash different from the previously set one by means of both the electronic device (8) for controlling and the mechanical device (10) for controlling. This function is realized by means of the electronic device (8) for controlling in the following way. The device (9) is exerted a single impact, whereby the electronic device (8) for controlling is deactivated, in this case all the data, including $P_0$ and $d_{rem}$, are deleted from its memory, and through exerting a single impact on the device (9) an operation mode of automatic locking of the movement of the spool (2) is activated according to the algorithm described above, but this time a new $P_0$ is set.

A prompt limiting of the movement of the pet for a required length of the leash through activating the mechanical device (10) for controlling in parallel with the operation of the electronic device (8) for controlling is realized in the following way. The movement of the spool (2) in the direction of reeling off is performed for the previously set $P_0$ at the moment, when value $d_{rem}>0$. Apart from that, the spring-loaded button (12) of the mechanical device (10) for controlling is continuously impacted upon. As a result, the mechanical device (10) for controlling by means of the transferring means (11) discontinues exerting an impact on the additional means (13) for locking the movement of the spool, the latter under the action of the spring being pressed (14) against the spool (2) with its surface and at the moment, when the additional means (13) for locking the movement of the spool starts to contact the surface of the protrusion (3), oriented in the direction of reeling off, the locking of the movement of the spool (2) occurs in the direction of reeling the leash off. Apart from that, the movement of the spool (2) in the direction of reeling in is not restrained.

When exerting an impact on the mechanical device (10) for controlling is discontinued, overcoming the resistance of the spring-loaded additional means (13) for locking the movement of the spool under the action of the spring the device returns the latter to an initial resting position and no longer participates in controlling the length of the leash.

The algorithm of implementation of the locking of the movement of the spool (2) in the direction of reeling off by means of the mechanical device (10) for controlling, when the electronic device (8) for controlling is deactivated, is identical to the one described above and may be implemented at any length of the leash (4) at any given time.

Thus, the invention as claimed is a retractable leash, the structural design of which allows for achievement of a technical effect consisting in a simplification of the structure, reducing the number of mechanically interacting elements subject to high loads, increasing the comfort of using and ensuring a possibility of a permanent operative control over the movements of the pet.

The invention claimed is:

1. A retractable leash comprising a housing containing a spring-loaded spool having a leash wound thereon and a device for controlling the length of the leash, comprising at least one means for locking the movement of the spool, characterized in that the device for controlling the length of the leash comprises a device for determining the movement of the spool, an electronic device linked thereto for controlling said means for locking the movement of the spool, a device for activating and deactivating the electronic device for controlling, at least one actuator of the means for locking the movement of the spool, said actuator being connected to the electronic device for controlling and comprising a fixing device of the means for locking the movement of the spool, and at least one power supply, wherein the spool is configured to have at least one outer protrusion that is configured to contact the means for locking the movement of the spool, to lock the movement of the spool in the direction of reeling the leash off, and to unlock the movement of the spool when the spool moves in the direction of reeling the leash in.

2. The retractable leash of claim 1, wherein the device for determining the movement of the spool is configured to determine the fact of movement made by the spool, to generate signals about the fact of movement made by the spool and to transfer them to the electronic device for controlling, the electronic device for controlling being configured to record based on the received signals the fact of movement made by the spool and to determine the direction of this movement of the spool.

3. The retractable leash of claim 2, wherein the device for activating and deactivating the electronic device for controlling, is configured to set a reference point ($P_0$) in the electronic device for controlling, for a number of recorded movements of the spool, wherein the value of the remaining number of recorded movements of the spool in the direction ($d_{rem}$) of reeling the leash off equals 0 ($d_{rem}=0$), and to remove the set $P_0$ from the electronic device for controlling.

4. The retractable leash of claim 3, wherein the electronic device for controlling is configured to compute $d_{rem}$ based on the signals received from the device for determining the movement of the spool.

5. The retractable leash of claim 4, wherein the electronic device for controlling is configured to generate a signal of locking the movement of the spool in the direction of reeling the leash off, when $d_{rem}=0$.

6. The retractable leash of claim 1, wherein the fixing device of the means for locking the movement of the spool is spring-loaded.

7. The retractable leash of claim 1, wherein the means for locking the movement of the spool is spring-loaded.

8. The retractable leash of claim 1, wherein the surface of the means for locking the movement of the spool contacting the surface of the protrusion of the spool, oriented in the direction of reeling the leash in, is generally rounded.

9. The retractable leash of claim 1, wherein the device for controlling the length of the leash comprises a spring-loaded mechanical device for controlling the means for locking the movement of the spool.

10. The retractable leash of claim 9, wherein the device for controlling the length of the leash comprises at least one additional means for locking the movement of the spool, configured to lock the movement of the spool in the direction of reeling the leash off or in the direction of reeling the leash off and in, the mechanical device for controlling being configured to control the additional means for locking the movement of the spool.

11. The retractable leash of claim 10, wherein the additional means for locking the movement of the spool is spring-loaded.

12. The retractable leash of claim 9, wherein the mechanical device for controlling the means for locking the movement of the spool comprises at least one transferring means, connected to the fixing device of the means for locking the movement of the spool or to the additional means for locking the movement of the spool.

13. The retractable leash of claim 1, wherein the protrusion of the spool is configured to contact the additional means for locking the movement of the spool.

14. The retractable leash of claim 1, wherein the electronic device for controlling is at least one controller and/or processor.

15. The retractable leash of claim 1, wherein the actuator of the means for locking the movement of the spool is chosen from a group, including an electric, a hydraulic, a pneumatic or a combined actuator.

16. The retractable leash of claim 1, wherein the power supply is an accumulator or a galvanic cell.

17. The retractable leash of claim 1, wherein the housing comprises at least one charge indicator of the power supply.

* * * * *